(12) United States Patent
Tanaka et al.

(10) Patent No.: US 6,506,472 B1
(45) Date of Patent: Jan. 14, 2003

(54) COMPOSITE SHEET AND METHOD FOR MAKING THE SAME

(75) Inventors: Yoshinori Tanaka, Kagawa (JP);
Yasuhiko Kenmochi, Kagawa (JP);
Masaharu Tomioka, Kagawa (JP)

(73) Assignee: Uni-Charm Co., Ltd., Ehime (JP)

( * ) Notice: Subject to any disclaimer, the term of this patent is extended or adjusted under 35 U.S.C. 154(b) by 0 days.

(21) Appl. No.: 09/674,581
(22) PCT Filed: Mar. 3, 2000
(86) PCT No.: PCT/JP00/01296
§ 371 (c)(1),
(2), (4) Date: Oct. 31, 2000
(87) PCT Pub. No.: WO00/53407
PCT Pub. Date: Sep. 14, 2000

(30) Foreign Application Priority Data

Mar. 5, 1999 (JP) .............................. 11-59512

(51) Int. Cl.$^7$ .............................. B32B 5/12; A47K 7/02; B43L 21/00
(52) U.S. Cl. .................. 428/105; 428/107; 428/113; 428/167; 428/172; 156/209; 156/292; 15/209.1; 15/226
(58) Field of Search ................................ 428/105, 107, 428/113, 114, 156, 172, 167, 153, 152; 156/209, 196, 292; 162/109; 15/209.1, 226

(56) References Cited

U.S. PATENT DOCUMENTS 4,601,938 A * 7/1986 Deacon et al. .............. 428/153

FOREIGN PATENT DOCUMENTS

| JP | 9-149873 | 6/1997 |
| JP | 9-313416 | 12/1997 |
| JP | 10-155713 | 6/1998 |
| JP | 11-235301 | 8/1999 |
| JP | 2000-93373 | 4/2000 |

* cited by examiner

Primary Examiner—Donald J. Loney
(74) Attorney, Agent, or Firm—Baker & Daniels

(57) ABSTRACT

A composite sheet including a base layer 7 and a surface layer. The surface layer is comprised of continuous fibers 8a and extends along a longitudinal axis C—C of the composite sheet 1. The surface layer is attached to at least one surface of the base layer 7 along a first attaching lines 5A extending at intervals in one half region of the surface layer defined by the longitudinal axis C—C and along second attaching lines 5B extending at intervals in another half region of the surface layer. The first and second attaching lines 5A, 5B extend in a direction intersecting the longitudinal axis C—C.

18 Claims, 9 Drawing Sheets

US 6,506,472 B1

COMPOSITE SHEET AND METHOD FOR MAKING THE SAME

FIELD OF THE INVENTION

This invention relates to a bulky composite sheet comprised of continuous fibers or filaments and, more particularly, to such a composite sheet suitably used to wipe up dust and dirt on floors, walls, windows, and the like.

BACKGROUD ART

In the accompanying drawings, FIGS. 8 and 9 are perspective views of composite sheets 101 comprising a base sheet, for example, made of a nonwoven fabric and continuous fibers heat-bonded with the base sheet and FIG. 10 is a perspective view of a holder 103 by which the composite sheet is held. These composite sheets 101 and holder 103 are described in Japanese Patent Application Laid-open No. 1997-149873. Floors can be wiped by the composite sheet 101 with the holder 103 in a user's hands to collect dust and dirt by the upper surface of the composite sheet 101. In this known composite sheet 101, a multiplicity of continuous fibers 108 are heat-bonded integrally with the base sheet 107 along attaching lines 105. Such a composite sheet 101 is made by placing the continuous fibers 108 upon the base sheet 107 and feeding them into a gap between a pair of heated rolls for embossing. As will be apparent from FIG. 8, crossings 131 of the attaching lines 105 are numerous in the composite sheet 101, and, therefore, the continuous fibers 108 disadvantageously tend to be unevenly distributed in the vicinity of these crossings 131 during an embossing process.

In the case of the composite sheet 101 as illustrated by FIG. 9, the continuous fibers 108 tend to shift transversely along an arrow Q toward a side edge of the base sheet 107 as the continuous fibers 108 and the base sheet 107 are fed in the direction as indicated by an arrow P to the pair of embossing rolls. Consequently, it is difficult to evenly distribute the continuous fibers 108 transversely of the base sheet 107.

SUMMARY OF THE INVENTION

An object of this invention is to provide a bulky composite sheet and a method for making such a composite sheet.

According to one aspect of this invention, there is provided a composite sheet having a longitudinal axis, the composite sheet comprising a base layer having upper and lower surfaces and a surface layer comprised of continuous fibers extending along the longitudinal axis and having a predetermined width defined between transversely opposite side edges of the surface layer extending along the longitudinal axis and attached to at least one of the upper and lower surfaces of the base layer by a plurality of attaching lines extending in a direction intersecting the longitudinal axis.

In such a composite sheet, the attaching lines comprise a plurality of first attaching lines extending at intervals in one half region of the surface layer defined on one side of the longitudinal axis extending so as to bisecting the width of the surface layer and a plurality of second attaching lines extending also at intervals in the other half region of the surface layer on the other side of the longitudinal axis. The first and second attaching lines extend obliquely to the longitudinal axis so as to intersect each other on extensions of the first and second attaching lines toward the longitudinal axis.

According to another aspect of this invention, there is provided a method for making a composite sheet having a longitudinal axis, the composite sheet comprising the steps of continuously feeding a base layer web having upper and lower surfaces and a surface layer web comprised of continuous fibers extending along the longitudinal axis and having a predetermined width defined between transversely opposite side edges of the surface layer extending along the longitudinal axis, placing the surface layer web upon at least one surface of the base layer web and attaching the surface layer web to the base layer web along a plurality of attaching lines extending in a direction intersecting the longitudinal axis.

In such a method, this invention further comprises the steps of deregistering and spreading a continuous fiber tow for the surface layer web to the predetermined width on the one surface of the base layer web and providing a plurality of first attaching lines extending at intervals in one half region of the surface layer web defined on one side of the longitudinal axis bisecting the width of the surface layer web and a plurality of second attaching lines extending also at intervals on the other half region of the surface layer web defined on the other side of the longitudinal axis so as to make the first and second attaching lines extend obliquely to the longitudinal axis and intersect each other on extensions of the first and second attaching lines toward the longitudinal axis, wherein the first and second attaching lines are successively formed from the longitudinal axis toward transversely opposite side edges of the surface layer web as the base layer web and the surface layer web are fed in the longitudinal axis.

DESCRIPTION OF THE BEST MODE FOR CARRYING OUT THE INVENTION

Details of a composite sheet and a method for making the same according to this invention will be more fully understood from the description given hereunder with reference to the accompanying drawings.

While this invention is not intended to be limited to a wiping sheet, an embodiment of this invention will be described primarily in terms of a wiping sheet.

Figure 1:
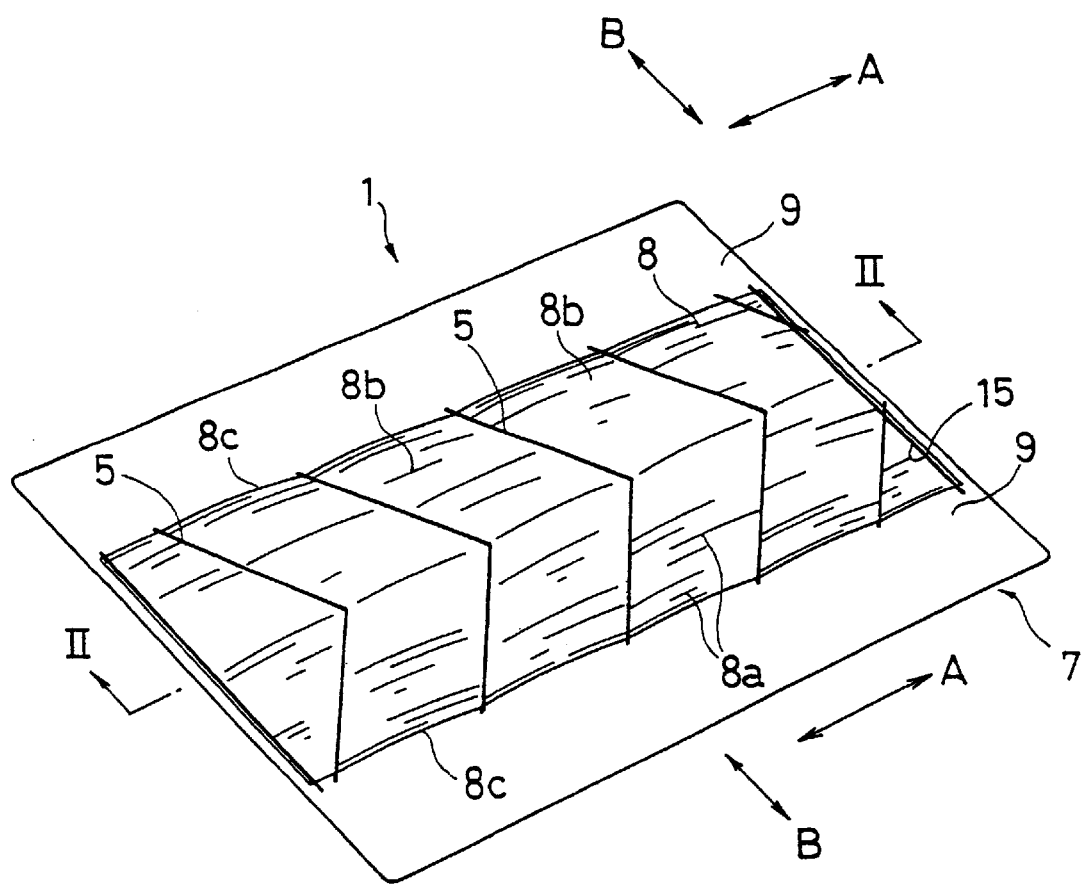
FIG. 1 is a perspective view showing one embodiment of a wiping sheet.
Figure 2:
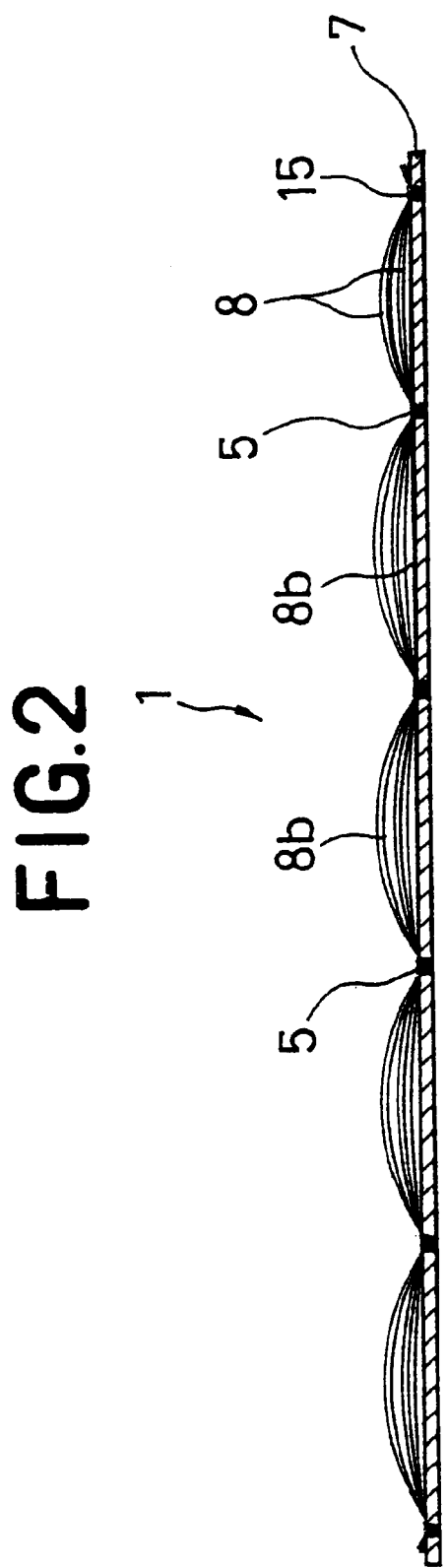
FIG. 2 is a section view along line II—II of FIG. 1.
Figure 10:
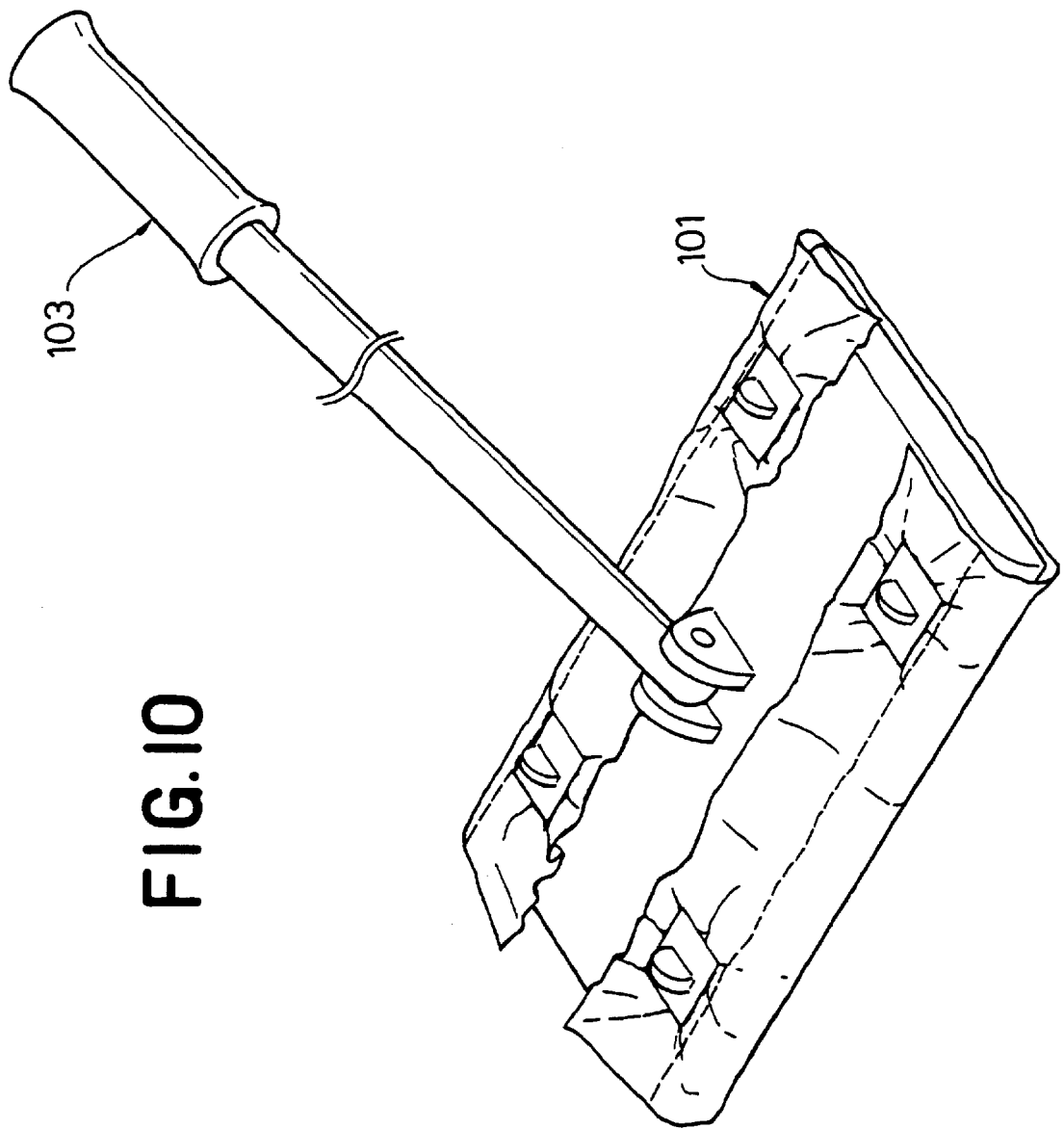
FIG. 10 is a perspective view of a holder equipped with a composite sheet.

FIG. 1 is a perspective view showing a wiping sheet 1 as one embodiment of the composite sheet of the invention. FIG. 2 is a section view along line II—II of FIG. 1. The wiping sheet 1 comprises a base layer 7 comprised of a thermoplastic nonwoven fabric and a surface layer 8 comprised of a multiplicity of thermoplastic continuous fibers (filaments) 8a which is attached to the upper surface of the base layer 7 along plurality of attaching lines 5. The wiping sheet 1 can be used with the base layer 7 fixed along its transversely opposite side edges 9 to a holder of FIG. 10 to wipe up dust and dirt on a floor by the surface layer 8, and also with the wiping sheet 1 held in a user's hand. The continuous fibers 8a of the surface layer 8 extend parallel one to another between the side edges 9 longitudinally of the base layer 7 (i.e., between right and left sides as indicated by an arrow A. The fibers 8a are bonded successively on the attaching lines 5 by heat and pressure and, as a result, the fibers 8a on the attaching lines 5 are no more fibrous and alternating compressed groove lines and arc describing rise regions 8b are defined. Preferably, a height of each of such arc describing rises is dimensioned more than three times a total thickness of a portion of the attaching line (a bottom of the compressed groove) and the base layer (see FIG. 2). such surface layer 8 of the continuous fibers exhibits excellent bulkiness, resiliency and compressibility characteristics as well as three dimensional appearance, and needless to say, these characteristics are higher than those of the base layer 7. In an actual use of the wiping sheet 1 the surface layer 8 is placed against the floor and moved in a direction as indicated by the arrow A or in a direction intersecting this at a right angle as indicated by an arrow B. This movement of the wiping sheet 1 ensures that the arc describing portions of the fibers 8a collect and hold dust and dirt in themselves. The surf ace layer 8 is also attached to longitudinal ends of the base layer 7 along attaching lines 15, but the provision of these attaching lines 15 is not necessarily required for the wiping sheet 1.

Figure 3:
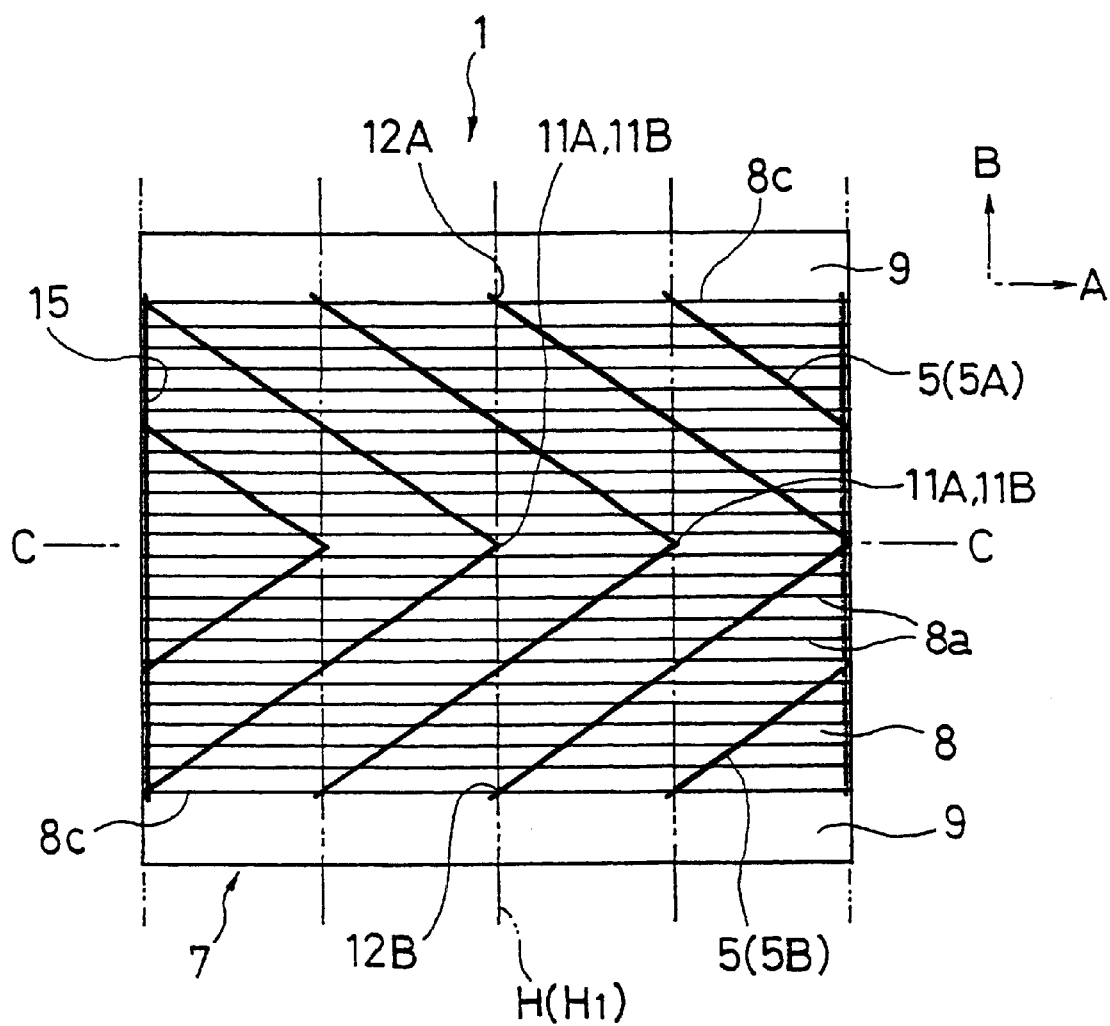
FIG. 3 is a plan view corresponding to FIG. 1.

FIG. 3 is a plan view of the wiping sheet 1. Widths of the surface layer 8 are schematically enlarged in this figure. The surface layer 8 has its width substantially bisected by longitudinal axis C—C. The base layer 7 has a plurality of first attaching lines 5A in an upper half region with respect to longitudinal axis C—C as viewed in FIG. 3 and a plurality of second attaching lines 5B in a lower half region. The first attaching lines 5A extend parallel one to another at substantially regular intervals and the second attaching lines 5B also extend in the similar manner. The first and second attaching lines 5A, 5B extend obliquely of the fibers 8a so that the first and second attaching lines 5A, 5B intersect each other if they further extend toward longitudinal axis C—C. It should be understood that the first and second attaching lines 5A, 5B can really intersect each other on longitudinal axis C—C as indicated in FIG. 3. The first and second attaching lines 5A, 5B extend at the same angle with respect to longitudinal axis C—C, i.e., to the fibers 8a. The first and second attaching lines 5A, 5B have their first ends 11A, 11B lying in vicinity of longitudinal axis C—C and their second ends 12A, 12B lying in vicinity of the side edges 9, respectively.

Referring to the drawing of FIG. 3, a plurality of chain imaginary lines H extend transversely of the wiping sheet 1 to intersect longitudinal axis C—C at right angles. Each imaginary line H intersecting the first ends of the corresponding pair of attaching lines 5A, 5B intersect the second ends 12A, 12B of the adjacent pair of attaching lines 5A, 5B. In FIG. 3, the imaginary line HI intersecting the first end 11 of each first attaching line 5A intersects the second end 12A of the first attaching line 5A before or after the adjacent one. All of the continuous fibers 8a extending parallel one to another in the direction A are attached to the base layer 7 on the first or second attaching lines 5A, 5B and the fibers 8a do not fall off from the base layer 7.

While a size of the base layer 7 of the wiping sheet 1 is not specified, the base layer 7 preferably has a length of 5~200 cm and a width of 5~50 cm. The base layer 7 may be formed by dimensionaly stable materials such as a woven or nonwoven fabric made of thermoplastic synthetic fibers and a thermoplastic synthetic resin film and others. Preferable examples of the nonwoven fabric include a spun-bonded nonwoven fabric and a spot-bonded nonwoven fabric both made of polyethylene/polyester conjugated fibers. The nonwoven fabric or film preferably has a unit weight of 5~200 g/m$^2$.

Examples of the continuous fibers 8a are continuous filaments made of polyethylene, polypropylene, nylon, polyester, rayon and others. A preferable example of the continuous fibers 8a can be obtained by deregistering or opening a bundle of these continuous fibers in a form of a tow and then spreading the opened fibers to a predetermined width by conventional methods. Tow is a commercially available rope-like bundle of continuous, polymeric filaments. The continuous fibers 8a may be a denier per filament of 2~20. The fibers 8a are preferably crimped ones since these offer bulkiness and compressibility facilitating good collection of dust and dirt on a floor. The number of crimps is preferably in a range of 5~25 crests/2.54 cm. It is recommended that the fibers 8a has a unit weight of 20~500 g/m$^2$. It is possible to treat the fibers 8a with oil or a hydrophilic surfactant in order to improve dust collecting efficiencies or water absorbing capabilities.

The attaching lines 5 preferably may extend at an angle of 10~80 degree, more preferably 15~75 degree with respect to longitudinal axis C—C. Though not specified, each attaching line 5 preferably has a width of 0.5~10 mm.

While FIG. 3 illustrates the fibers 8a as attached only to the upper surface of the base layer 7, it is possible to attach the fibers 8a also to the lower surface of the base layer 7. When the fibers 8a are attached to both the upper and lower surfaces of the base layer 7, the attaching lines 5 on the upper surface coincide with the attaching lines 5 on the lower surface in their patterns as well as in their placements.

Figure 4:
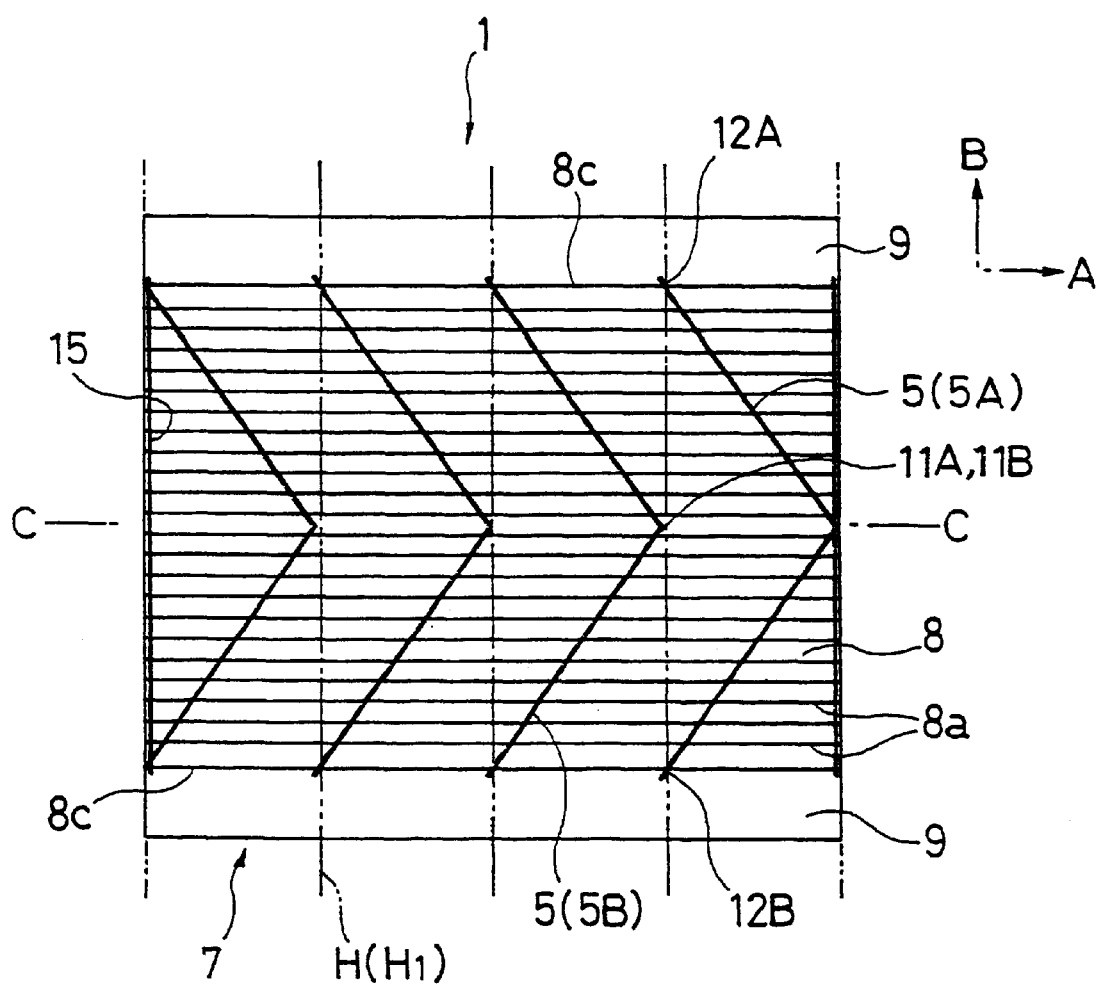
FIG. 4 is a view similar to FIG. 3 showing one embodiment of this invention.
Figure 5:
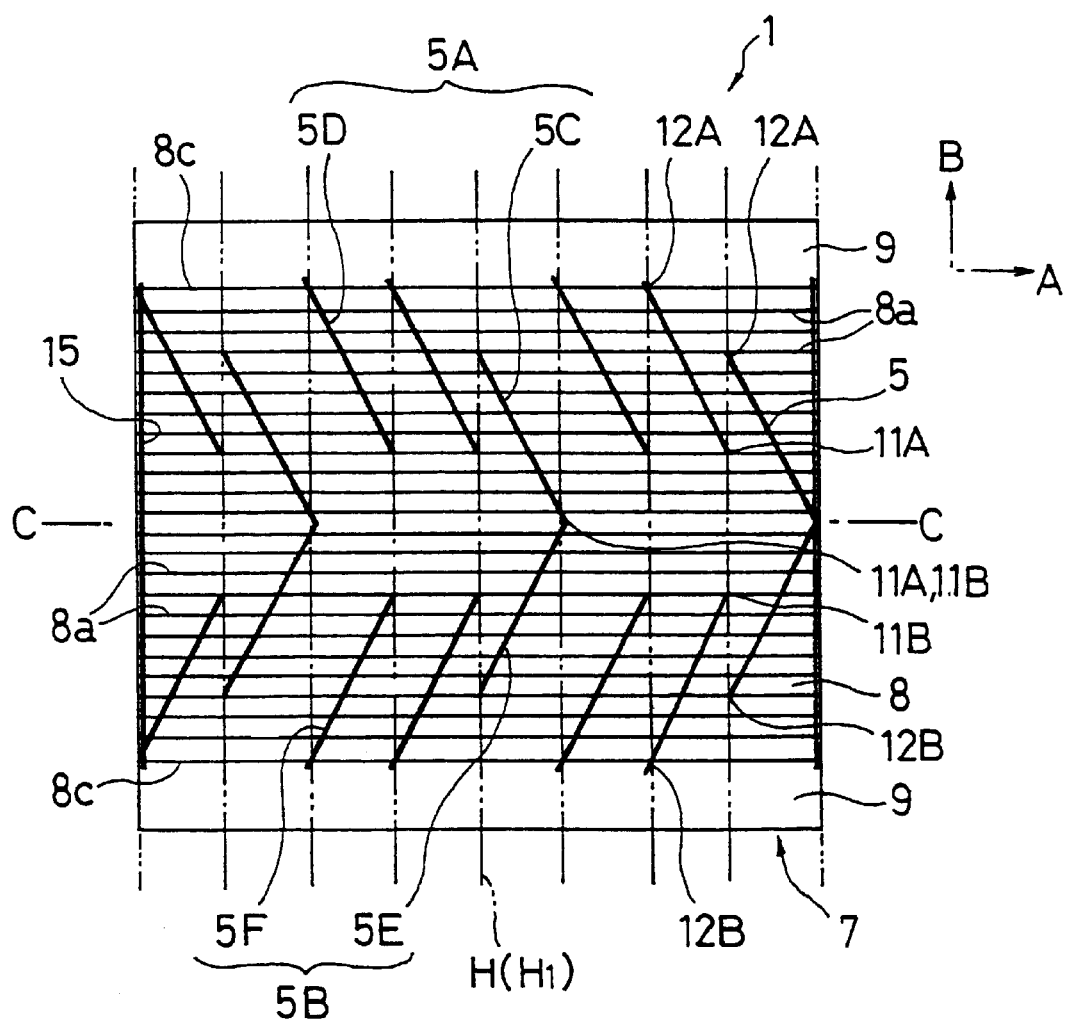
FIG. 5 is a view similar to FIG. 3 showing another embodiment of this invention.
Figure 6:
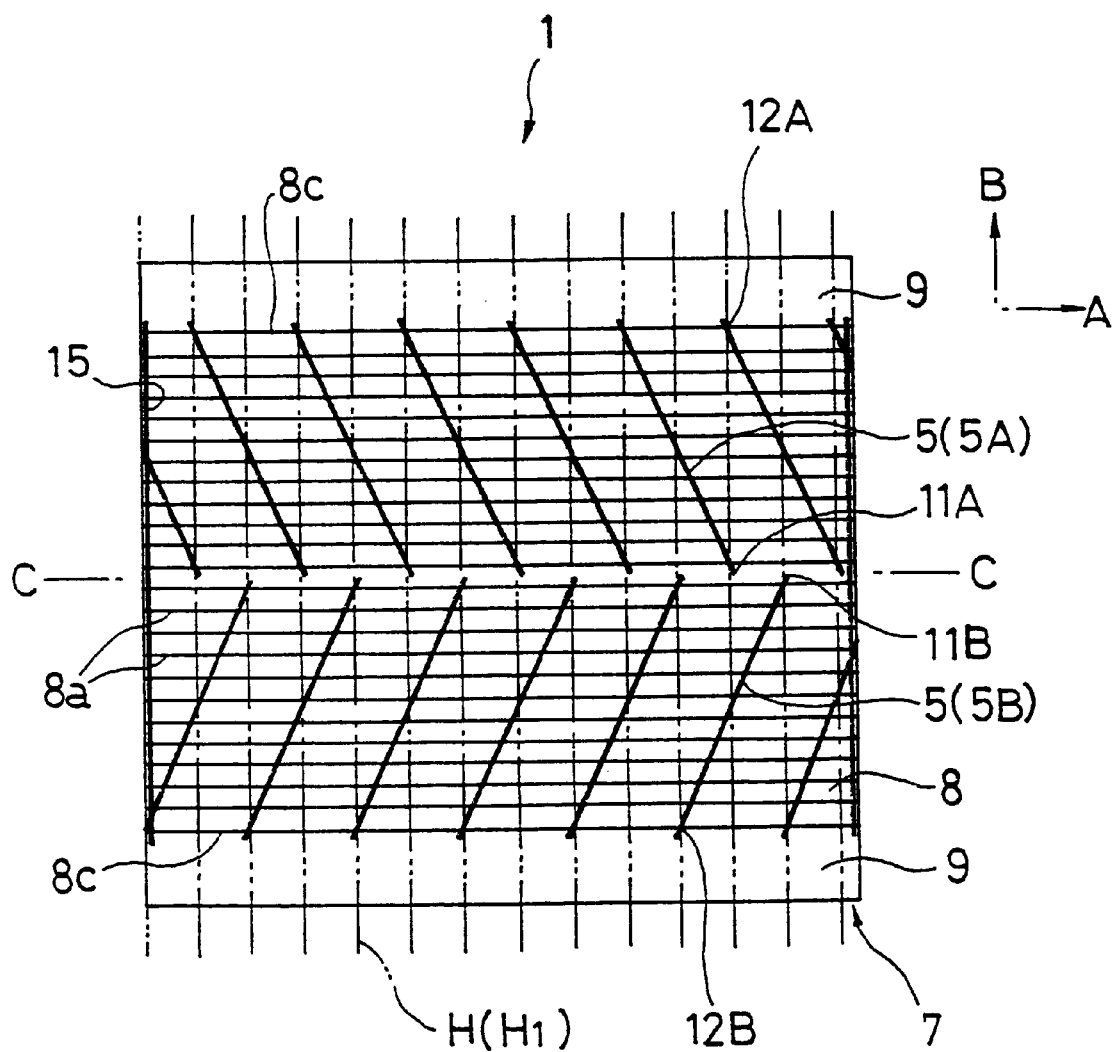
FIG. 6 is a view similar to FIG. 3 showing still another embodiment of this invention.

FIGS. 4~6 are views similar to FIG. 3 showing other embodiments of this invention. In the wiping sheet 1 shown in FIG. 3, the imaginary line H intersecting the first end 11A of each first attaching line 5A intersects the second end 12A of the immediately adjacent first attaching line 5A.

In the wiping sheet 1 shown in FIG. 5, all of the attaching lines 5 are relatively short. The first attaching lines 5A distributed in the upper half region with respect to longitudinal axis C—C comprise the first attaching lines 5c having their first ends 11A on longitudinal axis C—C and the first attaching lines 5D having their second ends 12A on one of the side edges 9 of the base layer 7. Similarly, the second attaching lines 5B distributed in the lower half region with respect to longitudinal axis C—C comprise the second attaching lines 5E having their first ends 11B on longitudinal axis C—C and the second attaching lines 5F having their second ends 12B on the other side edge 9 of the base layer 7. It should be understood that, in the case of the first and second attaching lines 5A, 5B shown in FIG. 5, the ends of the respective attaching lines lying on or adjacent longitudinal axis C—C are referred to as the first ends 11A, 12A, while the ends thereof lying on or adjacent the side edges 9 are referred to as the second ends 11B, 12B. The imaginary line H intersecting the first end 11A of each first attaching line 5C or 5D intersects the second end 12A of the immediately adjacent first attaching line 5C or 5D. The same relationship is kept between the second attaching line 5B and the imaginary line H. The fibers 8a are attached to the base layer 7 along either the first attaching lines 5A comprising 5C and 5D or the second attaching lines 5B comprising 5E and 5F. In this manner, the fibers 8a do not fall off from the base layer 7.

In the case of the wiping sheet 1 shown in FIG. 6, the attaching lines 5 extend from longitudinal axis C—C to the side edges 9 but the first ends 11A, 11B of the first and second attaching lines 5A, 5B are out of intersection on longitudinal axis C—C. However, the extensions of these first and second attaching lines 5A, 5B toward longitudinal axis C—C intersect each other. The imaginary line H intersecting the first end 11A of each first attaching line 5A intersects the second end 12A of the immediately adjacent first attaching line 5A. The same relationship is kept between the second attaching line 5B and the imaginary line H.

The wiping sheet 1 as has been described above in reference with FIGS. 3–6 can be made by placing a web for the surface layer 8 of the continuous fibers 8a spread to a predetermined width upon a web for the base layer 7 and continuously feeding these webs into a gap defined between a pair of heated rolls for an embossing treatment. At least one of the pair of rolls has projections presenting a pattern corresponding to the attaching lines 5 and the pair of rolls are rotated so that the attaching lines 5 may be successively formed on the web of the surface layer 8 from the longitudinal axis C—C toward transversely opposite side 8c thereof. In this manner, the fibers 8 can be distributed on the web of the base layer 7 with a substantially uniform thickness as the attaching lines 5 are successively formed. This is true even when the web of the surface layer 8 are fed to the rolls under a condition that the web of the surface layer 8 is relatively dense in a transversely middle zone thereof.

Figure 7:
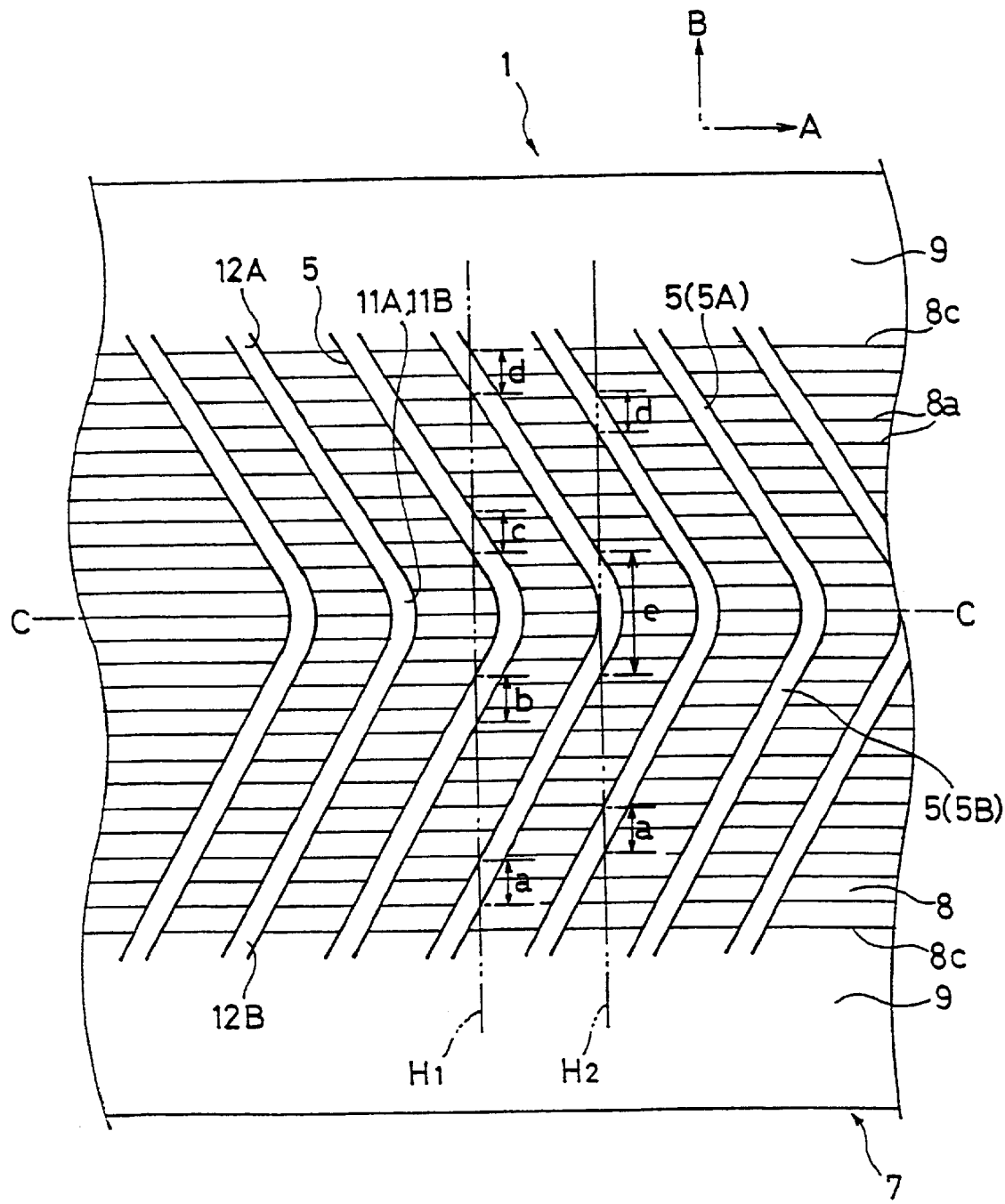
FIG. 7 is a fragmentary scaled-enlarged figure corresponding to FIG. 3.
Figure 8:
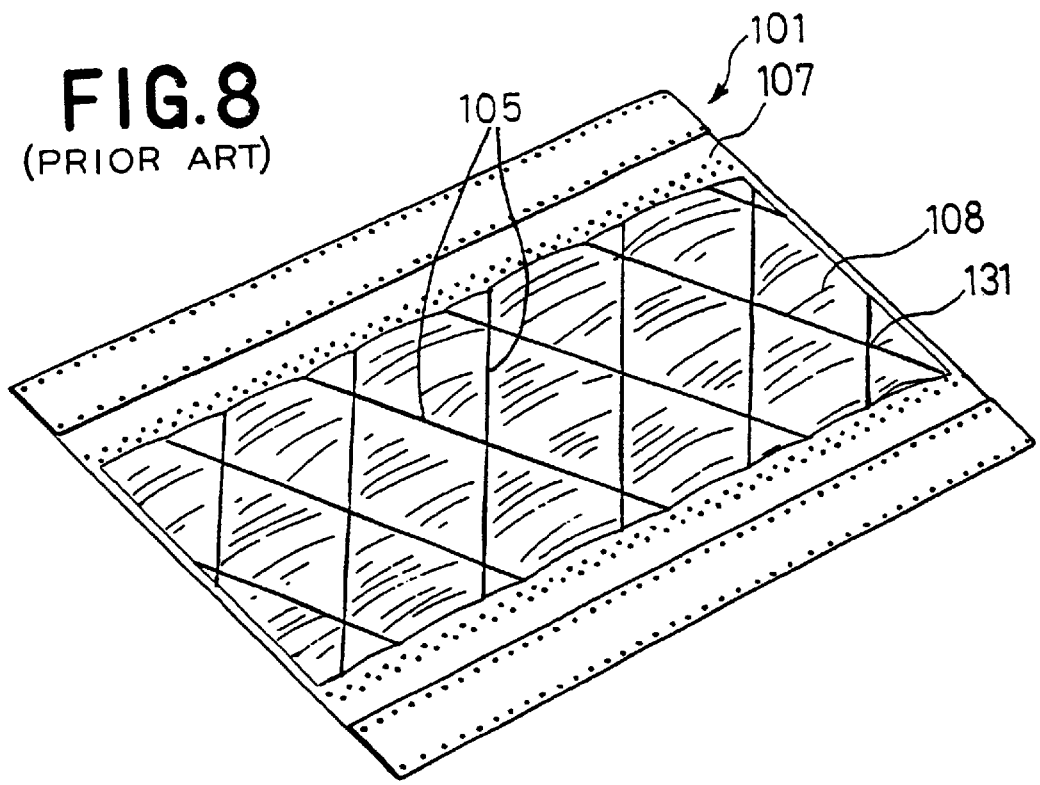
FIG. 8 is a plan view showing a wiping sheet of prior art.
Figure 9:
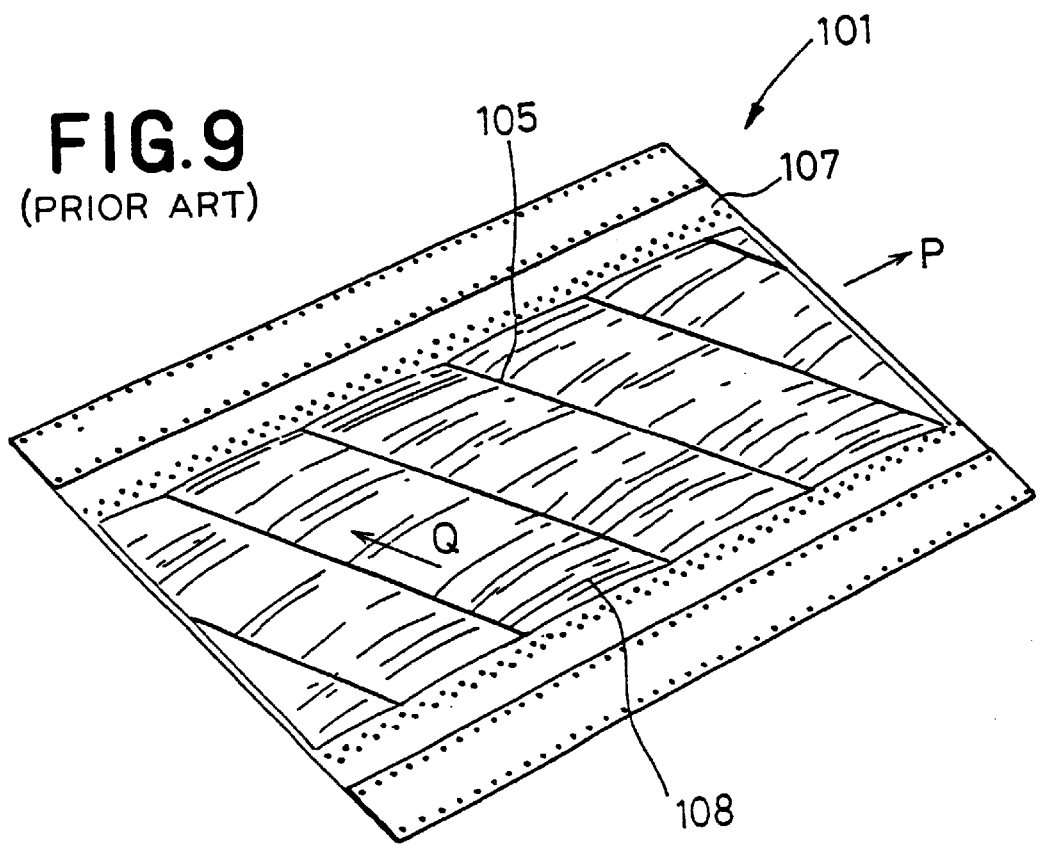
FIG. 9 is a view similar to FIG. 8 of prior art.

FIG. 7 is a scale-enlarged fragmentary figure corresponding to FIG. 3, illustrating a manner in which the attaching lines 5 intersect the imaginary lines H. An effective length L of the attaching line 5 along the imaginary line H corresponds to a total length of portions at which the attaching line 5 intersects the imaginary line H. For example, an attaching length $L_1$ in connection with the imaginary line $H_1$ can be expressed by $L_1 = a+b+c+d$. Similarly, an attaching length $L_2$ in connection with the imaginary line $H_2$ can be expressed by $L_2 = a+d+e$. The effective length L depends on patterns of the attaching lines 5. It is preferable in this invention to have the attaching lines 5 to provide an effective length L of which a ratio of a maximum versus a minimum is less than 2. For example, the pattern of the attaching lines 5 is selected so that the imaginary lines H intersecting the first ends 11A, 11B of the attaching lines 5 may intersect also the second ends 12A, 12B as in the embodiments shown in FIGS. 3–6. Such patterns of the attaching lines 5 enable the web of the surface layer 8 and the web of the base layer 7 to be contacting continuously the projections of the rolls for embossing. Since the rolls are not intermittently but continuously pressing these webs, the continuous fibers 8a of the web of the surface layer 8 can be easily spread with a uniform thickness on the web of the base layer 7. In an embossing machine chances of damages caused by intermittently pressing can be also diminished.

In next steps of the sheet obtained by the above process the web of the surface layer 8 are attached to the web of the base layer 7 along such an attaching line 15 as shown in FIG. 3, and these webs are cut off into such a composite sheet as shown in FIGS. 3–6. The composite sheet can be used not only for the wiping sheet 1 but also for a cushioning material if the surface layer 8 of the continuous fibers 8a are bulky and a disposable or non-disposable water absorbing material if the continuous fibers 8a are hydrophilic or water-absorbent.

The composite sheet according to this invention has a surface layer of the continuous fibers attached to the base layer with a substantially uniform thickness. Being free from unevenness of the distribution of the fibers, this composite sheet can be used as a wiping sheet good for wiping uniformly a floor or the like.

The composite sheets of this invention are useful for a wide variety of applications including wipers for general propose household and many other end uses.

What is claimed is:

1. A composite sheet having a longitudinal axis, said composite sheet comprising:
    a base layer having upper and lower surfaces;
    a surface layer comprised of continuous fibers extending parallel to said longitudinal axis and having a predetermined width defined between transversely opposite side edges of said surface layer; and
    a plurality of attaching lines which attach the continuous fibers to at least one of the upper and lower surfaces of the base layer, said plurality of attaching lines extending in a direction intersecting said longitudinal axis,
    said attaching lines comprising a plurality of first attaching lines that extend from one of said opposite side edges and terminate in a vicinity of said longitudinal axis at intervals in a one half region of said surface layer defined on one side of said longitudinal axis so as to bisect said width of said surface layer and a plurality of second attaching lines that extend from the other one of said opposite side edges and terminate in a vicinity of said longitudinal axis also at intervals in another half region of said surface layer on another side of said longitudinal axis, said first and second attaching lines extending obliquely to said longitudinal axis so as to intersect each other on extensions of said first and second attaching lines toward said longitudinal axis.

2. The composite sheet according to claim 1, wherein said first attaching lines are parallel to one another at substantially regular intervals in said one half region and said second attaching lines are parallel one to another at substantially regular intervals in said another half region.

3. The composite sheet according to claim 1, wherein said continuous fibers of said surface layer are obtained by deregistering a continuous fiber tow and spreading the deregistered fiber tow into a substantial uniform web having a predetermined width.

4. The composite sheet according to claim 1, wherein each of said attaching lines (define) comprise a compressed groove.

5. The composite sheet according to claim 1, wherein said surface layer has arc-shaped regions defined between adjacent ones of said attaching lines, each of said arc-shaped regions having bulkiness, resiliency and compressibility characteristics that are higher than bulkiness, resiliency and compressibility characteristics of said base layer, a height of each of said arc-shaped regions being at least three times a total thickness of a portion of said attaching lines and said base layer.

6. The composite sheet according to claim 1, wherein said base layer has a length of about 5 to about 200 cm along said longitudinal axis and a width of about 5 to about 50 cm in said direction intersecting said longitudinal axis.

7. The composite sheet according to claim 1, wherein said base layer has a unit weight of about 5 to about 200 g/m$^2$ and said surface layer has a unit weight of about 20 to about 500 g/m$^2$.

8. The composite sheet according to claim 1, wherein said continuous fibers of said surface layer have a denier per fiber of about 2 to about 20.

9. The composite sheet according to claim 1, wherein said first and second attaching lines substantially intersect each other along said longitudinal axis.

10. The composite sheet according to claim 1, wherein said first and second attaching lines extend from said longitudinal axis to said transversely opposite side edges of said surface layer.

11. The composite sheet according to claim 1, wherein a ratio of a maximum versus a minimum of a total length of crossings between an imaginary line extending at a right angle to said longitudinal axis across said surface layer and said first and second attaching lines is less than 2.

12. The composite sheet according to claim 1, wherein said base layer and said surface layer contain a thermoplastic material and said attaching lines are formed by melting said thermoplastic material.

13. The composite sheet according to claim 1, wherein said attaching lines comprise lines that are bonded by heat and pressure.

14. A method for making a composite sheet having longitudinal axis, said method comprising the steps of:

continuously feeding a base layer web having upper and lower surfaces and a surface layer web comprised of continuous fibers extending along said longitudinal axis and having a predetermined width defined between transversely opposite side edges of said surface layer web extending along said longitudinal axis, said continuous fibers being formed by deregistering and spreading a fiber tow;

placing said surface layer web upon at least one surface of said base layer web; and attaching said surface layer web to said base layer web along a plurality of attaching lines extending in a direction intersecting said longitudinal axis, said plurality of attaching lines including a plurality of first attaching lines extending at intervals in a one half region of said surface layer web defined on one side of said longitudinal axis so as to bisect said width of said surface layer web and a plurality of second attaching lines extending at intervals in another half region of said surface layer web defined on another side of said longitudinal axis, said first and second attaching lines extending obliquely to said longitudinal axis so that extensions of said first and second attaching lines in a direction toward said longitudinal axis intersect each other, said first and second attaching lines being successively formed from said longitudinal axis toward transversely opposite side edges of said surface layer web as said base layer web and said surface layer web are fed in a direction of said longitudinal axis.

15. The method according to claim 14, wherein said first attaching lines are parallel one to another at substantially regular intervals in said one half region and second attaching lines are parallel one to another at substantially regular intervals in said other half region.

16. The method according to claim 14, wherein said first attaching lines and said second attaching lines respectively have first ends lying in a vicinity of said longitudinal axis and second ends lying in vicinity of said side edges of said surface layer web and a line transversely extending across said continuous fibers of said surface layer web intersects the first end of a first attaching line and the second end of a second attaching line, or a first end of a second attaching line and a second end of a first attaching line.

17. The method according to claim 14, wherein said first attaching lines and said second attaching lines are formed so that a ratio of a maximum versus a minimum of a total length of crossings between an imaginary line extending at a right angle to said longitudinal axis and said first and second attaching lines is less than 2.

18. The method according to claim 14, wherein said base layer web and said surface layer web contain a thermoplastic material and said first attaching lines and second attaching lines are formed by melting said thermoplastic material.

* * * * *